(12) United States Patent
Urbanek

(10) Patent No.: US 6,668,209 B2
(45) Date of Patent: Dec. 23, 2003

(54) INJECTION MOLDING MACHINE ARRANGEMENT

(75) Inventor: Otto Urbanek, Linz (AT)

(73) Assignee: Engel Maschinenbau G.m.b.H., Schwertberg (AT)

(*) Notice: Subject to any disclaimer, the term of this patent is extended or adjusted under 35 U.S.C. 154(b) by 0 days.

(21) Appl. No.: 10/137,092

(22) Filed: May 1, 2002

(65) Prior Publication Data
US 2002/0188374 A1 Dec. 12, 2002

(30) Foreign Application Priority Data
May 3, 2001 (AT) .......................................... 707/2001

(51) Int. Cl.$^7$ ............................................. B29C 45/76
(52) U.S. Cl. ...................... 700/200; 700/201; 425/162; 340/310.01
(58) Field of Search ................................ 700/200, 201, 700/203, 204; 425/149, 155, 29, 135, 102, 125; 340/310.01

(56) References Cited

U.S. PATENT DOCUMENTS

| | | | |
|---|---|---|---|
| 4,349,324 A | * 9/1982 | Neff et al. ................... | 425/149 |
| 4,815,106 A | 3/1989 | Propp et al. | |
| 4,880,372 A | * 11/1989 | Keida ......................... | 425/145 |
| 5,016,184 A | * 5/1991 | Gutjahr ....................... | 700/200 |
| 5,410,292 A | 4/1995 | Le Van Suu | |
| 6,000,831 A | * 12/1999 | Triplett ........................ | 700/204 |

FOREIGN PATENT DOCUMENTS

| | | | | |
|---|---|---|---|---|
| EP | 0917034 | 5/1999 | ......... | G05B/19/418 |
| WO | 0046923 | 8/2000 | ............ | H03K/7/04 |

* cited by examiner

Primary Examiner—Albert W. Paladini
(74) Attorney, Agent, or Firm—Notaro & Michalos P.C.

(57) ABSTRACT

Injection-molding machine arrangement comprising at least one injection molding machine with at least one, especially internal, machine control system—especially with a stored program control and/or with associated actuators and/or sensors—for computer-assisted process monitoring and control of the injection molding machine, wherein the injection-molding machine arrangement provides at least one mains supply transmission unit for data transmission via at least one mains electricity supply—preferably in a bi-directional and/or real-time-capable manner.

20 Claims, 1 Drawing Sheet

INJECTION MOLDING MACHINE ARRANGEMENT

BACKGROUND OF THE INVENTION

The present invention relates to an injection-moulding machine arrangement comprising at least one injection moulding machine with at least one machine control system for computer-assisted process monitoring and control of the injection moulding machine as well as a method for the operation of such an injection-moulding machine arrangement.

Injection moulding machines which are driven and controlled by machine control systems, preferably by stored program control (SPC) are known from the prior art. Moreover, the setting and scanning of process data via data networks hard-wired to the injection moulding machine or via the Internet (EP 0 917 034 A1) with additionally connected external data-processing equipment is also known. Although these solutions allow the control and monitoring of injection moulding machines from remote locations, they are bound to the fixed installation of additional data networks, which means, on the one hand, considerable installation costs and, on the other hand, offers only limited flexibility for change, for example, in the machine structure.

SUMMARY OF THE INVENTION

The object of the invention is therefore to provide an injection-moulding machine arrangement and a method for the operation of this injection-moulding machine arrangement which overcomes the above-named disadvantages.

According to the invention, this object is achieved in that the injection-moulding machine arrangement provides at least one mains supply transmission unit for data transmission via at least one mains electricity supply.

This data transmission according to the invention to and from an injection-moulding machine arrangement via a mains supply (e.g. the 230 volt electricity supply) allows data from the injection-moulding machine arrangement to be scanned from any position and/or allows data control commands to be transmitted to the injection-moulding machine arrangement using appropriate external mobile and/or stationary data-processing equipment such as a personal computer (PC) or a laptop connected to a mains supply. In general, the versions according to the invention provide a very flexible basis for servicing, controlling and driving injection moulding machines from almost any location desired, provided an appropriate mains supply connection is available at these locations. In this context, it is particularly favourable if the data transmission takes place in real-time and in a bi-directional manner or only in a bi-directional manner. An internal machine control system, such as e.g. a stored program control with associated actuators and sensors can be used as the machine control system.

The standard alternating-current mains supply immediately suggests itself as an initial variant for data transmission according to the invention. Accordingly, one favourable variant envisages a low voltage mains electricity supply with a supply voltage less than 1000 volts and a frequency between 50 Hz (Hertz) and 60 Hz, preferably a 230 volts alternating-current supply with an alternating-current frequency of 50 Hz.

Alternatively, however, all other mains supplies—preferably alternating-current mains supplies, such as a power-current supply or a three-phase supply can be used according to the invention with corresponding transmission devices. Accordingly, it is particularly favourable in the case of injection moulding machines to use the three-phase or power-current connections available according to the prior art. However, the use of normal 230 volt alternating-current mains supplies offers the advantage that these mains supplies are available and accessible at almost any external position desired, and therefore that the transmission of data to and from injection-moulding machine arrangements according to the invention is possible from almost any required location.

Moreover, particularly favourable variants envisage that the mains supply transmission device provides at least one adapter for connection to the mains electricity supply coupled to the machine control system of the injection-moulding machine arrangement, preferably via the LAN (local area network). In this context, it is always possible to connect the data transmission via a mains supply to any other form of data network by means of an appropriate adapter. For example, a connection to the Internet or to mobile communications networks can be realised using appropriate adapters and/or converters.

One particularly favourable arrangement of the adapter of the mains supply transmission unit in the injection-moulding machine arrangement with a main incoming line and a main switch is provided by arranging the adapter in the main incoming line preferably between the main switch and the electrical components of the injection moulding machine.

For the operation of such an injection-moulding machine arrangement, one favourable method envisages that the preferably internal machine control system of the injection moulding machine transmits and receives data—preferably in a bi-directional manner and/or in real-time—via the mains supply transmission unit and the mains electricity supply.

This method provides numerous possibilities for data transmission to and from and/or for scanning and setting injection moulding machines. For example, it is envisaged that the preferably internal machine control system of the injection moulding machine exchanges data—preferably in a bi-directional manner and/or in real-time with at least one external, partially mobile and/or stationary data processing unit and/or with at least one printer and/or with at least one mobile communications transmission unit and/or with at least one other data network—preferably the Internet and/or a LAN network.

Moreover, it is favourable if the preferably internal machine control system of the injection moulding machine transmits information on the production process—preferably error messages—via the mains supply transmission unit preferably in the form of an SMS and/or e-mail—automatically and preferably in a bi-directional manner and/or in real-time. Other variants envisage that process data from the preferably internal machine control system of the injection moulding machine can be scanned by at least one external, partially mobile and/or stationary data processing unit via the mains electricity supply—preferably in a bi-directional manner and/or in real-time. This variant allows, for example, current process data to be scanned from an injection-moulding machine arrangement and allows the data to be analysed in an external data-processing device, preferably providing a larger computing capacity, and/or to be used for process modelling. In this context, appropriate control commands arising from the analysis and/or the process modelling can be transmitted back to the injection-moulding machine arrangement via the mains supply. Accordingly, favourable variants envisage that the preferably internal machine control system of the injection moulding machine is set via the mains electricity supply from at least one external, mobile and/or stationary data-processing device—preferably in real-time and/or in a bi-directional manner.

In order to provide regular up-dating of the software installed on the machine control system of at least one injection moulding machine, it is particularly favourable if the software—preferably at least one control program—is exchanged via the mains electricity supply between the preferably internal machine control system of the injection moulding machine and at least one external data-processing device, whereby a version check of the programs present on the systems communicating with one another is preferably implemented.

By way of data protection, favourable variants envisage moreover that the injection-moulding machine arrangement implements an authorisation check preferably automatically and preferably in a bi-directional manner and/or in real-time—before data and/or control commands are exchanged with at least one—preferably mobile—external data-processing device via the mains electricity supply and/or before data from the injection-moulding machine arrangement are scanned.

Moreover, one version variation envisages that the injection-moulding machine arrangement is serviced via the—preferably bi-directional and/or real-time-capable—mains supply transmission device. In consequence, very flexible and regular servicing of the injection-moulding machine arrangement can be ensured. On the other hand a considerable reduction in costs incurred for servicing work is achieved, because many servicing stages can be implemented online, thereby rendering the use of on-site servicing personnel unnecessary in many cases.

BRIEF DESCRIPTION OF DRAWINGS

Further features and details of the invention are presented in the following description of the figures. It is shown in:

FIG. 1 shows the connection of an injection-moulding machine arrangement 1 to a data network 11 using the mains supply line 9 for the electrical energy.

DETAILED DESCRIPTION OF THE INVENTION

Figure 1:
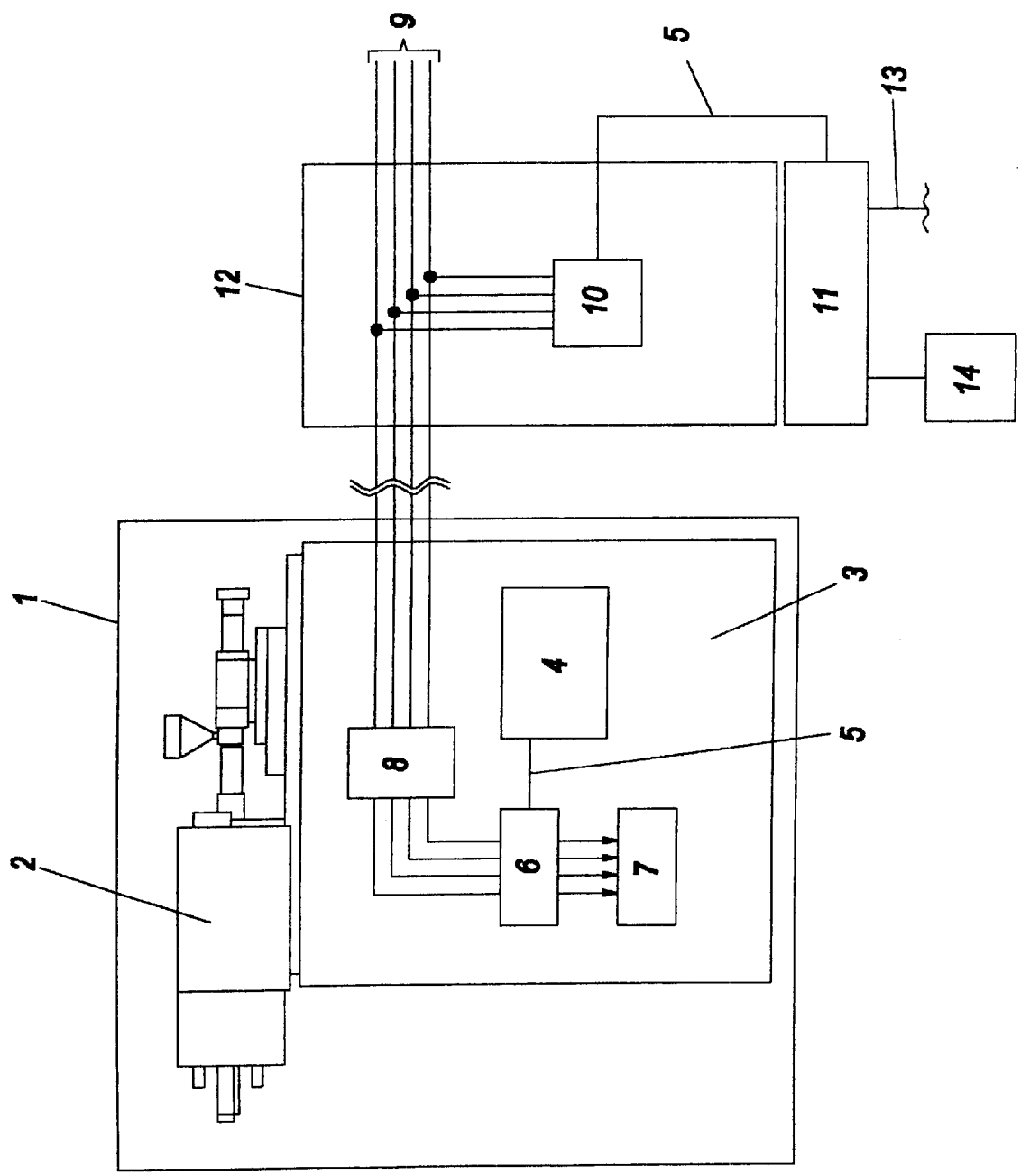
FIG. 1 a schematic diagram for the connection of an injection-moulding machine arrangement to a data network using the mains supply line for the electrical energy.

The injection-moulding machine arrangement 1 shown in FIG. 1 provides a machine part 2 and a control and supply block 3 of an injection moulding machine. A machine control unit 4, a main switch 8 and various electrical components 7 are shown schematically within the control and supply block 3 of the injection moulding machine. The internal connections between the machine control unit 4 and the electrical components 7 and other components, which are not illustrated, correspond to the prior art. The electrical components 7 are for example sensors and/or actuators and/or electrical motors and/or pumps which are necessary to operate and control the injection moulding machine. They are on the one hand connected to the mains supply line 9 to provide them with electrical energy and on the other hand connected to the machine control system 4 (not shown in FIG. 1) to control them. The way how the electrical components 7 are connected to the mains supply line 9 and the control unit 4 as well as the way how they are controlled by the control system 4 can be any known in the art.

A mains supply transmission unit (adapter) 6 is built into the mains supply 9 between the main switch 8 and the electrical components 7. This adapter 6 fitted in the injection-moulding machine arrangement 1, is connected directly to the main incoming line 9. Moreover, the adapter 6 provides a connection for a data network 5 based on conventional-technology e.g. ether-net, by means of which it is connected to the network connection of the machine control system 4. Accordingly, a local network (LAN) 5 with at least two participants exists between the adapter 6 and the machine control system 4. As an alternative to the variant shown here, the adapter 6 may also be integrated directly in the machine control unit 4.

The electricity supply unit 12 of the company is also connected to the main incoming line 9. Within the electricity supply unit 12, another adapter 10 is connected to the mains supply 9 for the transmission of data via a mains supply. Furthermore, the adapter 10 provides a connection for a local network (LAN) 5 for connection to the complete local network 11 of the company. This arrangement shown in FIG. 1 allows data transmission via a mains supply between the machine control 4 and any connections of the local data network 11 of the company.

In this context, high frequency signals, with the assistance of which data can be transmitted, are modulated to the electrical voltage of the energy supply by appropriate mains supply transmission units 6, 10 (adapters). These adapters 6, 10 can also filter out signals modulated in this manner converting the data flows for conventional network technologies (for example, ether-net or token-ring etc.) 5, 11.

In other words data, transmission between the machine control system 4 and an external data processing equipment or network such as the local network 11 of the company is realised via the mains supply transmission unit (adapter 6) and the mains supply line 9. The local network 11 is therefore connected to the mains supply line 9 by way of the mains supply transmission unit (adapter) 10. For sending information from the control system 4 to a computer of the network 11 the data from the control system 4 is transmitted to the adapter 6 via the network line 5. Adapter 6 then modulates a carrier wave of mains supply line 9 with the information received from the control system 4. Adapter 10 is made to filter out said information signals modulated by adapter 6 to convert the information for conventional data flows and to transmit the data to the data network 11. If information is transmitted from the data network 11 to the machine control system 4, a carrier of wave of the mains supply line 9 is modulated with the information by the adapter 10. In this case adapter 6 filters out said information and transmits it to the machine control system 4. Adapters 6 and 10 comprise a modulation and demodulation circuitry known in the art.

In this manner, one or more additional adapters 6, 10 can be fitted within the in-company mains supply 9. All of these adapters are used to establish the connection with other network participants and/or to an existing local data network 11. As in the case of the adapter 6, the adapter 10 can also be integrated directly into the data-processing device (not shown here) of the local data network 11 of the company. This is advisable primarily if the mains supply used for data transmission a normal 230 volt alternating-current mains supply. However, if a power-current or three-phase supply is used for data transmission, the use of separate adapters 6 and/or 10 is recommended, as shown in FIG. 1; for reasons of safety, these are not connected directly to the relevant machine control or data-processing devices but via local networks (LAN). Alongside the in-company data communication realised in the above manner via the mains supplies 9, the arrangement shown schematically in FIG. 1 also allows data communication between the machine control unit 4, an injection-moulding machine arrangement 1 and any data-processing device arranged at any desired location. For example, with the co-operation of the relevant electricity supply company (operator of the public grid), adapters outside the in-company mains supply 9 can also be connected, thereby allowing a data connection of at least one injection-moulding machine arrangement 1 to data-processing devices outside the company using the public mains supply (not shown here). Alternatively, data communication can also be realised with external data-processing devices via mobile communications connection 14 or via an Internet connection 13. In this context, all currently known methods and forms of data transmission such as SMS, e-mail, www (world wide web) etc. can be used for data transmission.

Particularly preferred areas of application for data transmission according to the invention are as follows:

- The loading of programs, whereby, because of the bi-directional nature of the communication, the version of the relevant software is automatically communicated to the control unit by the software-transmitting station, in order to ensure that updates are only carried out when this is necessary.
- Interactive services which rely on the real-time capability of the components participating in the data connection, e.g. process optimisation. Data can be scanned item by item directly from the machine 2, 3 and transmitted to a central, preferably external computer. This computer carries out complex calculations which would overload the local computing capacity of the control unit, and the results of these calculations and/or control commands resulting from these calculations are then transmitted back to the control unit, preferably in real-time.
- A simulation of more complex procedures could also be offered as a service—provided by a central computer—whereby this simulation can calculate with data registered in real-time.
- For remote servicing and/or remote transmission, it is also generally favourable if analysis data and process monitoring data can be uploaded and downloaded according to the invention on the basis of real-time data processing.

The usefulness of data transmission according to the invention from and/or to injection-moulding machine arrangements 1 is not restricted to the simple example shown in FIG. 1 with only one injection moulding machine 2, 3. For example, the injection-moulding machine arrangement 1 may provide several injection moulding machines 2, 3 with one or more adapters 6 and also other combinations.

What is claimed is:

1. Injection-moulding machine arrangement comprising at least one injection moulding machine with at least one machine control system for computer-assisted process monitoring and control of the injection moulding machine, characterised in that the injection-moulding machine arrangement provides at least one mains supply transmission unit connected to said machine control system and at least one mains electricity supply for data transmission via said mains electricity supply between said machine control system and at least one external data-processing equipment or network.

2. Injection-moulding machine arrangement according to claim 1, characterised in that the machine control system is an internal machine control system.

3. Injection-moulding machine arrangement according to claim 1, characterised in that the machine control system provides a stored program control with associated actuators and sensors.

4. Injection-moulding machine arrangement according to claim 1, characterised in that data are transmitted via the mains electricity supply and the mains supply transmission unit in a bi-directional manner or in a bi-directional manner and in real-time.

5. Injection-moulding machine arrangement according to claim 1, characterised in that the mains electricity supply is a low-voltage supply with a supply voltage less than 1000 volt and a frequency between 50 Hz and 60 Hz.

6. Injection-moulding machine arrangement according to claim 1, characterised in that the mains supply transmission unit comprises at least one adapter connected to the machine control system of the injection-moulding machine arrangement for connection to at least one mains electricity supply.

7. Injection-moulding machine arrangement according to claim 6, characterised in that the adapter is connected to the machine control system via a LAN network.

8. Injection-moulding machine arrangement comprising at least one injection moulding machine with a main switch in the main incoming line series-connected on the load side to the electrical components of the injection moulding machine according to claim 6, characterised in that the adapter is arranged in the main incoming line between the main switch and the electrical components of the injection moulding machine.

9. Method for operating an injection-moulding machine arrangement according to claim 1, characterised in that the machine control system of the injection moulding machine transmits and receives data via the mains supply transmission unit and the mains electricity supply to and from at least one external data-processing equipment or network.

10. Method according to claim 9, characterised in that the machine control system of the injection moulding machine transmits and receives data in a bi-directional manner or in a bi-directional manner and in real-time via the mains supply transmission unit and the mains electricity supply.

11. Method according to claim 9, characterised in that the machine control system of the injection moulding machine exchanges data via the mains supply transmission unit with at least one external, partially mobile or stationary data-processing device or with at least one printer or with at least one mobile communications transmission unit or with at least one other data network.

12. Method according to claim 11, characterised in that the other data network is the Internet or a LAN network.

13. Method according to claim 9, characterised in that the machine control system of the injection moulding machine automatically transmits information for the production process via the mains supply transmission unit.

14. Method according to claim 13, characterised in that the information for the production process is transmitted in the form of an SMS or an e-mail.

15. Method according to claim 9, characterised in that the process data from the machine control system of the injection moulding machine are scanned via the mains electricity supply by at least one external, partially mobile or stationary data-processing device.

16. Method according to claim 9, characterised in that the machine control system of the injection moulding machine is controlled via the mains electricity supply from at least one external, mobile or stationary data-processing device.

17. Method according to claim 9, characterised in that software is exchanged via the mains electricity supply between the machine control system of the injection moulding machine and at least one external data-processing device.

18. Method according to claim 17, characterised in that a version check is implemented with reference to the programs present on the devices communicating with one another.

19. Method according to claim 9, characterised in that injection-moulding machine arrangement implements an authorisation check before data or control commands are exchanged via the mains electricity supply with at least one external data-processing device or before data from the injection-moulding machine arrangement are scanned.

20. Method according to claim 9, characterised in that the injection-moulding machine arrangement is serviced via the mains supply transmission device.

* * * * *